(No Model.) 5 Sheets—Sheet 1.
C. B. HATFIELD.
SCALLOPING MACHINE.

No. 372,618. Patented Nov. 1, 1887.

Witnesses.
Chas. R. Burr.
A. J. Stewart.

Inventor,
Charles B. Hatfield
By Church & Church
his Attorneys.

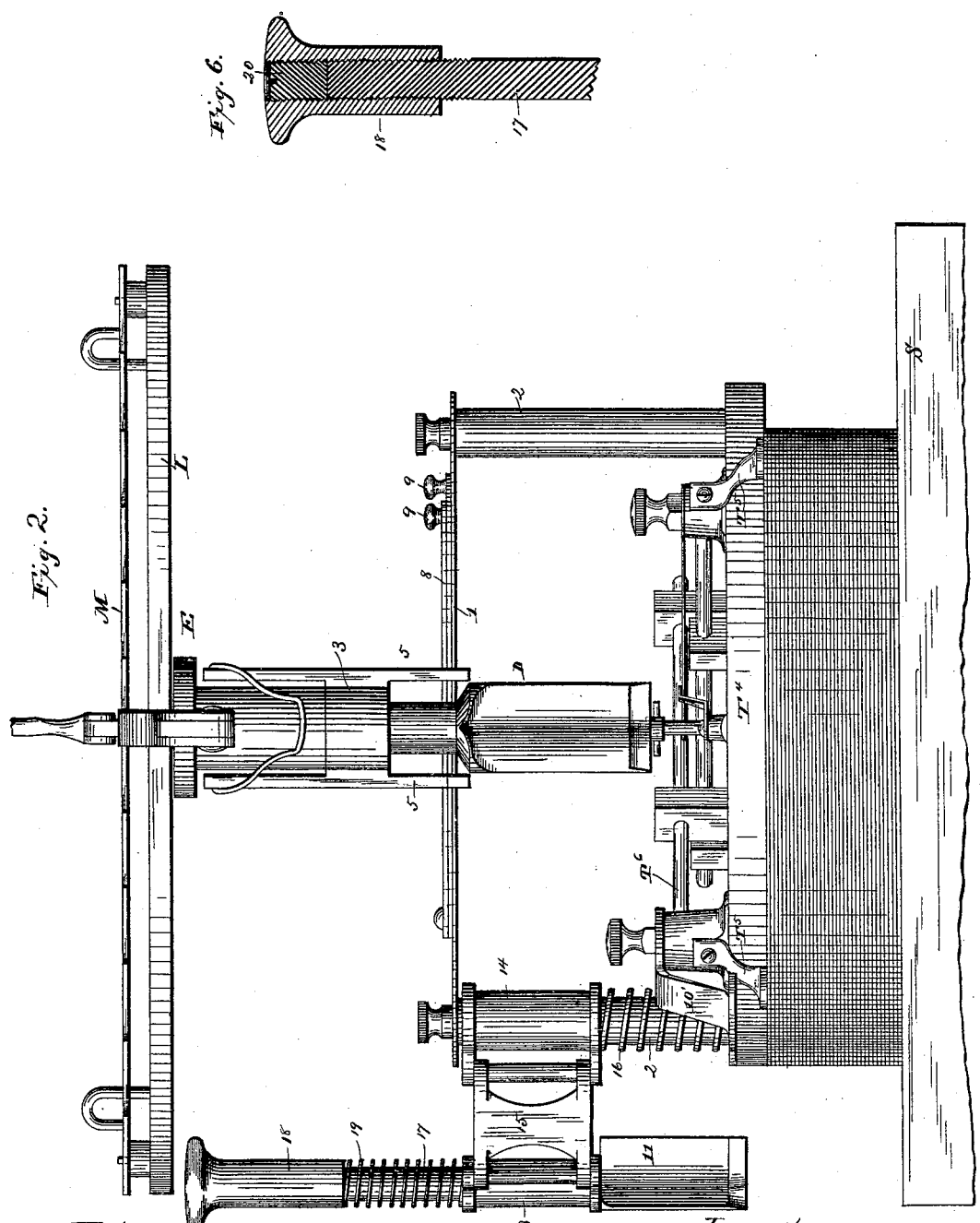

(No Model.)  C. B. HATFIELD.  5 Sheets—Sheet 3.
SCALLOPING MACHINE.
No. 372,618. Patented Nov. 1, 1887.
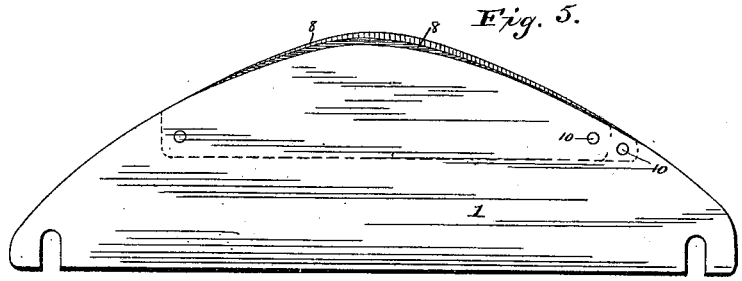
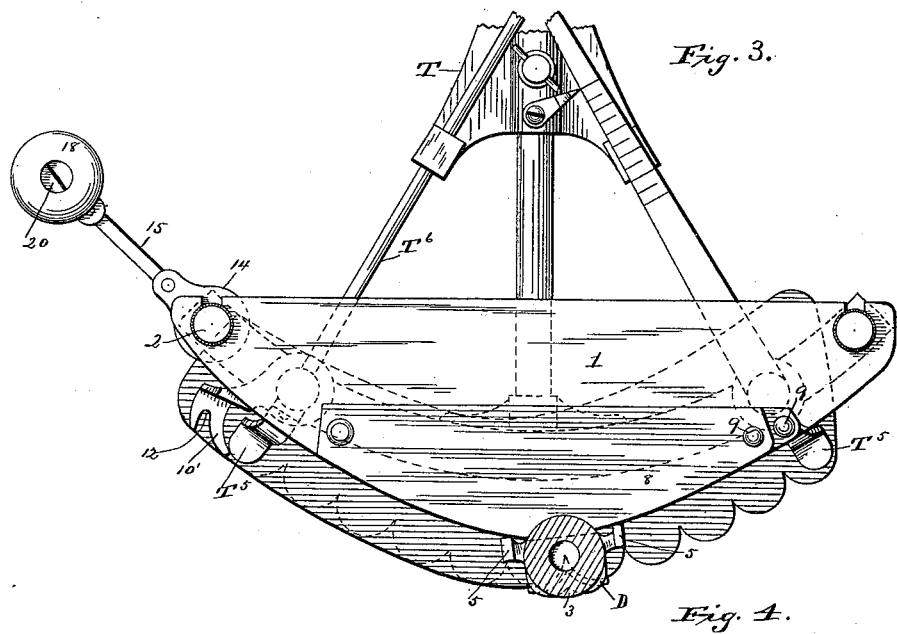
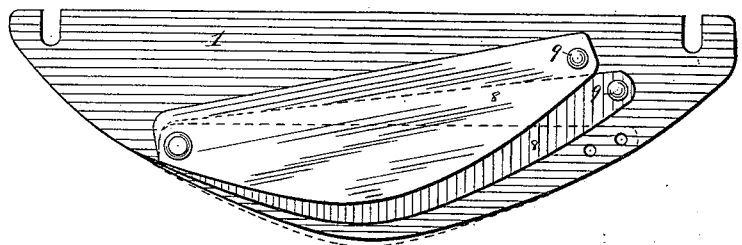

(No Model.) 5 Sheets—Sheet 4.
C. B. HATFIELD.
SCALLOPING MACHINE.

No. 372,618. Patented Nov. 1, 1887.

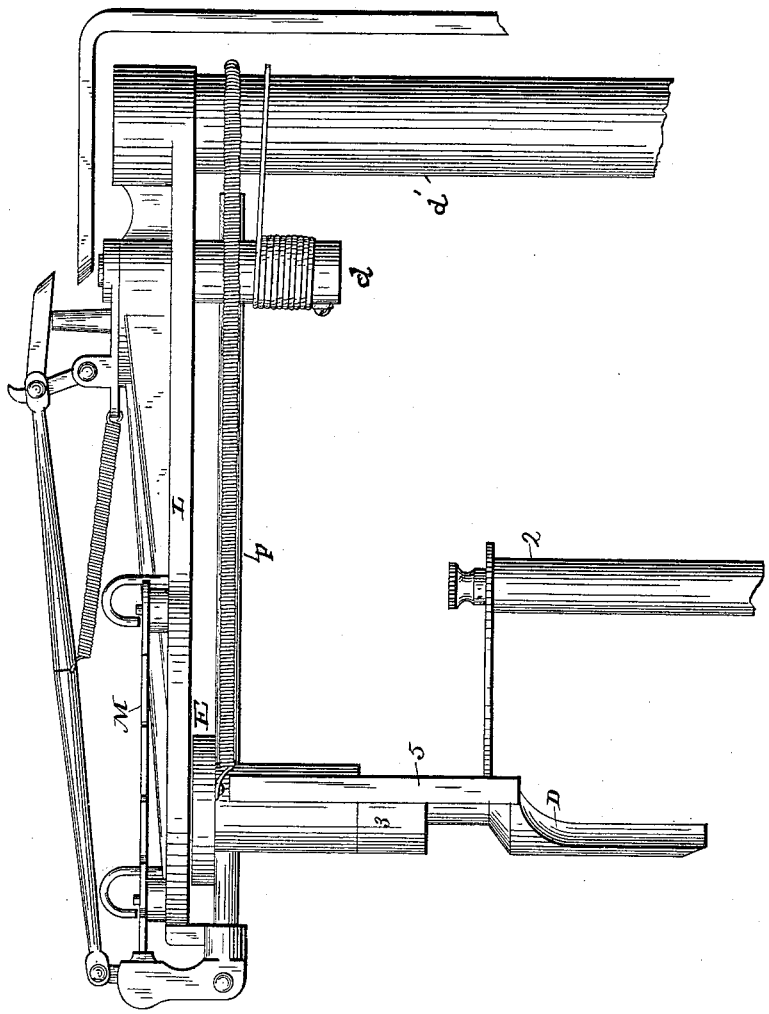

UNITED STATES PATENT OFFICE.

CHARLES B. HATFIELD, OF ROCHESTER, NEW YORK.

SCALLOPING-MACHINE.

SPECIFICATION forming part of Letters Patent No. 372,618, dated November 1, 1887.

Original application filed June 5, 1886, Serial No. 209,250. Divided and this application filed July 22, 1887. Serial No. 245,008. (No model.)

*To all whom it may concern:*

Be it known that I, CHARLES B. HATFIELD, of Rochester, in the county of Monroe and State of New York, have invented certain new and useful Improvements in Scalloping-Machines; and I do hereby declare the following to be a full, clear, and exact description of the same, reference being had to the accompanying drawings, and to the figures and letters of reference marked thereon.

This invention relates to certain improvements in scalloping-machines, more especially designed and adapted for use in connection with a machine such as shown in my prior application of June 5, 1886, No. 209,250, of which latter the present application constitutes a continuation or a division as to certain features; and it consists, generally, in improvements in devices for controlling the movements of the cutter, devices supplemental to or independent of the main cutter for effecting the last cut, and devices for adjusting and placing the blanks in position, all as hereinafter more fully described and pointed out.

Figure 1:
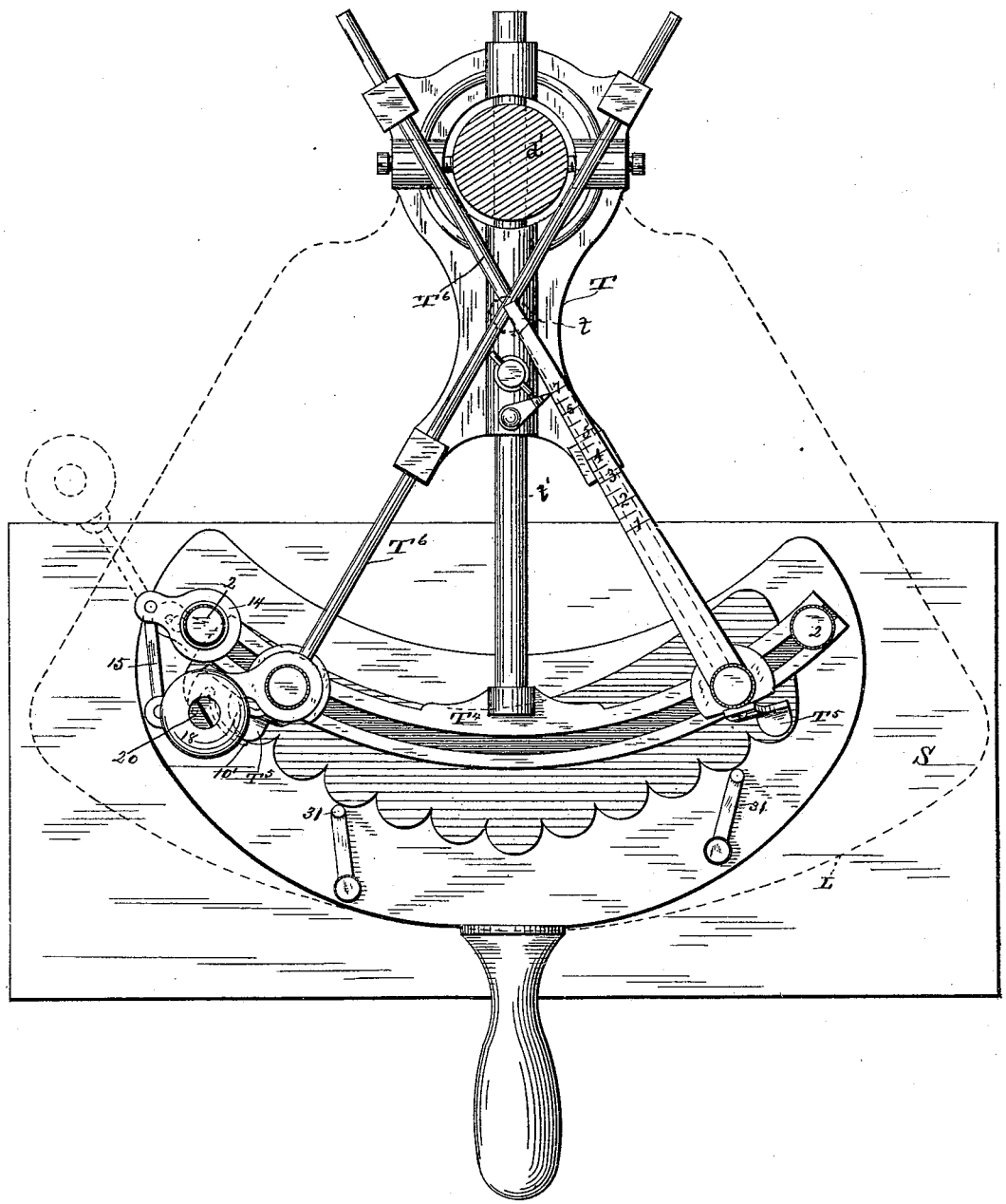
Figure 7:
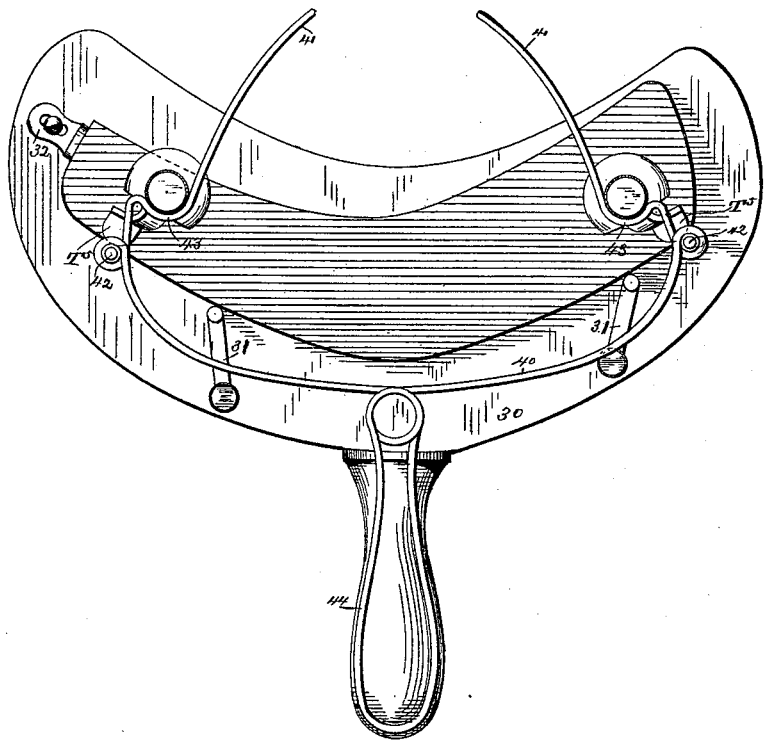
Figure 8:
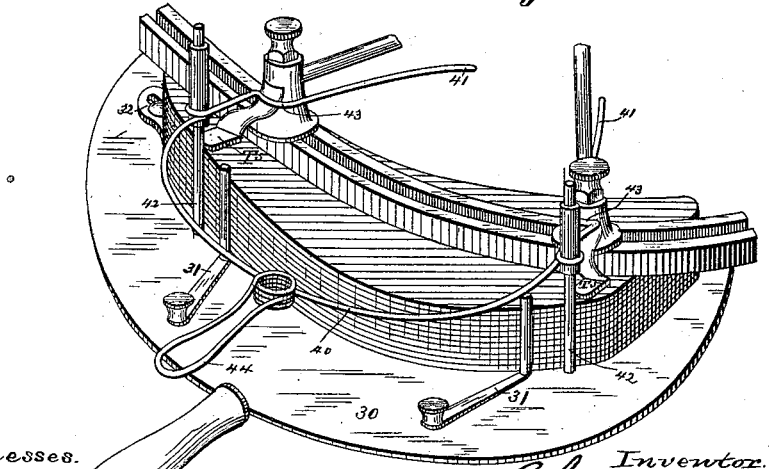

In the accompanying drawings, Figure 1 is a top plan view representing the adjustable presser-bar of my prior application and illustrating the application thereto of the supplemental cutter and blank-placer. Fig. 2 is a front elevation of the presser-bar, main chisel, and reciprocating plate or head, with the chisel gage or guide and supplemental cutter applied thereto. Fig. 3 is a top plan view showing the supplemental chisel and gage-plate applied to the presser-bar. Fig. 4 is a top and Fig. 5 a bottom view of the gage-plate. Fig. 6 represents a longitudinal section through the head of the supplemental chisel; Fig. 7, a top plan view; Fig. 8, a perspective view of the blank adjusting and placing devices, and Fig. 9 is a side elevation of the upper portion of the machine.

Similar letters of reference in the several figures designate the same parts.

The cutting-chisel D, head E, arm F, arm or plate L, ratchet-segment M, cutting-block S, presser-bar T, adjustable block $T^4$, rods $T^6$, and metal pieces or guides $T^5$ are substantially the same in construction and relative arrangement as the corresponding parts in my before-mentioned application.

The chisel-head E, carrying the chisel D, is movable radially and laterally beneath the vertically-reciprocating plate L. The presser-bar is adjusted back and forth to bring the guides $T^5$ in proper position relative to the end scallops. The presser-bar holds the blanks firmly in adjusted position, and the chisel, being forced down by the plate L and advanced one or more notches of the ratchet at each reciprocation, cuts the requisite number of scallops. To this end the head E, carrying the chisel D, is arranged to slide longitudinally of the rod F, which latter is pivotally supported upon the stud $d$, connected to and actuated by the plate L, the latter being actuated by the plunger $d'$, between which and the cutting-block S both the chisel and blanks are located, so that the chisel being rendered movable or adjustable both radially and laterally, or, in other words, backward and forward and from side to side of the cutting-block and plate L, it can be adjusted to any desired position to accommodate itself to the irregularly-curved edge of the blank, and as the plate L and the cutting-block are caused to approach, the chisel, previously adjusted to the desired position, will be driven through the blanks.

The head of a presser-bar, instead of being secured to a plunger working within the plunger $d'$ of the carrying-plate L, is in the present instance mounted upon the plunger $t$ in advance of the plunger $d'$, which latter is slotted to accommodate the rear end of the rod $t'$ of the presser-bar. In all other respects the construction and operation of the parts just described are substantially the same as corresponding parts in my prior application, No. 204,250, of which latter the present application is filed as a division or continuation, in so far, at least, as the claims based upon these parts and comprehending the combination of the relatively-movable plate L and cutting-block when used in connection with a laterally-movable chisel and stops and gages are concerned.

As is well known, the flies are usually cut on different curves, and in passing from one curve to another it is necessary, in order to preserve the symmetry of the scallops, that the cutter should be rotated slightly on its longitudinal axis. In order to thus guide the cutter and guide it accurately in its radial as well as its rotary movements, I construct a former or gage-plate, 1, with an edge or bearing-surface conforming to the shape of the desired blank and mount this gage upon one or more supports (preferably on posts 2 on opposite ends of the presser-bar, as shown) in rear of the cutter, and I secure to the latter a saddle or guide, 3, formed or provided with a vertical rib or bearing, 5, on each side of the cutter. The two ribs 5 are caused to bear against the edge of the gage-plate or former 1—as by a spring (not shown) pressing the chisel-head E inward—so that as the chisel is reciprocated and moved from side to side in cutting the scallops its position will at all times be accurately governed by the edge of the gage-plate or former.

By mounting the "former" above the presser-bar and intermediate the ends of the chisel, and providing the saddle with bearings on opposite sides of the chisel, the requisite movements of the latter can be effected without danger of cramping, and at the same time the chisel will be held accurately in adjusted position during its downward movements in cutting the scallops.

Button fly-blanks for different sizes and styles of shoes vary both in length and the shape of the curved edge, and in order to obviate the necessity which would otherwise exist of removing the former when different-sized flies are to be cut and substituting another having the desired configuration, I provide a series of movable formers, 8, and attach them to the plate or former 1, so that any one or more of said formers can be swung into position to act upon the chisel.

One of the most convenient arrangements of interchangeable or adjustable formers is that shown in Figs. 4 and 5, wherein the lower plate, 1, is formed with the straightest sweep or least curve intended for cutting the largest size flies. The next plate has its edge curved more sharply for the next smaller size, and so on, the convexity of the edges gradually increasing from the largest to the smallest fly-blank. These supplemental formers are pivoted at one end to the largest plate, 1, and at or near the opposite extremity are provided with a hand piece or knob, 9, and a pin or projection, 10, for entering a hole in the next lower former.

The several formers being marked to indicate the size of shoe to which they belong, when any given size of fly is to be scalloped it is only necessary to turn back or out of the way the series of formers above the one appropriated to the desired size. This leaves the former belonging to the designated size in place, with its curved edge projected beyond the formers remaining in position, so that it alone will act upon the chisel to adjust the latter.

The chisel usually employed in scalloping-machines is not designed nor is it adapted for cutting the last scallop or notch at the lower end of the fly; hence this last cut has heretofore always been made by hand. To avoid this inconvenience and render the machine competent to finish the flies while in position under the presser-bar, I attach to the latter a guide or gage, 10', and mount a supplemental chisel, 11, in position to be conveniently swung under the reciprocating arm or plate L, so that while the blanks remain clamped under the presser-bar said supplemental chisel can be swung or moved into position against the gage, and by depressing the plate L can be caused to make this final cut for finishing the blanks.

The gage 10' is preferably mounted upon the adjustable block $T^4$, so that it will follow the movements of the guide attached to said block and serve to locate the last scallop cut by the main chisel. The gage 10' is adjustably and removably secured to the said post, so that other formers or gages can be substituted and the position changed relative to the guide $T^5$.

The supplemental chisel is provided with a cutting-edge corresponding in shape to the end notch or recess, (see Fig. 1,) and the gage 10' is provided with a notch, 12, adapted to receive and properly guide the cutting-edge. It is designed that this supplemental chisel should be mounted in a movable support, so that it can be swung or moved back from under the plate L when not in use or while the main cutter is in operation. A convenient arrangement for thus supporting the chisel and permitting the requisite movements with respect to the gage and reciprocating plate is shown in the drawings. It comprises two sockets, 13 and 14, united by a link, 15. The socket 14 fits over the post 2 and is held in elevated position by a spring, 16. The shank 17 of the chisel 11 passes through the socket 13 and is provided with an adjustable head, 18, between which and the socket 13 a spring, 19, is interposed. The head 18 is threaded on the end of the shank 17, to provide for the adjustment of the chisel as it or the main chisel is ground away in sharpening, and in order to maintain and regulate the adjustment a set-screw, 20, is located within the head 18. The chisel turns freely within the socket 13, so that its blade may be fitted to the gage 10', and the double socket-and-link connection permits it to be adjusted to different distances from the post 2, so as to follow the adjustment of the gage 10' and at the same time permit the chisel to be swung from under the head or plate L when not in use.

Other and equivalent devices for supporting the supplemental chisel so that it can be moved into position and from under the reciprocating plate will readily suggest themselves to the skilled mechanic; hence I do not wish to be understood as limiting myself to the precise construction shown.

When operating upon a number of blanks simultaneously, some difficulty is experienced and time consumed in properly placing the pile of blanks under the presser-bar while adjusting the latter, and at the same time maintaining the assembled blanks even with their edges in a vertical plane. To overcome this difficulty I provide a smooth-surfaced plate, 30, with two or more adjustable pins or gages, 31, and an adjustable end gage, 32. The pile of blanks are placed upon this plate and shaken or shifted until their front edges are brought against the pins, which latter stand vertically or at right angles to the surface of the plate 30. The series of blanks having thus been adjusted so that their edges coincide, the presser-bar is raised and held elevated, while the plate 30, with the pile of blanks, is slipped underneath and adjusted relative to the guides on said presser-bar. When the pile of blanks has thus been located, and while the presser remains elevated, a stripper or holder, 40, is applied, and the plate 30 is withdrawn from the pile of blanks, leaving the latter in adjusted position beneath the presser-bar, which, as it descends, clamps and holds the blanks.

The stripper 40 consists of a frame, preferably of spring-wire, formed or provided with two arms, 41, each of the latter carrying a pin or post, 42, a stop, 43, and a curved extension, 44. The two stops or shoulders 43, when brought against the adjustable blocks or guides on the presser-bar, determine the position of the pins 42 relative to the front of the presser-bar; and the pins 42, projecting down and in front of the pile of planks, serve not only to prevent the latter from being withdrawn as the plate 30 is slid from under, but they also operate as gages to determine the position of the front edge of the pile of planks where the scallops are to be formed and their relation to the presser-bar and former 1. The curved extensions 44 of the arms facilitate the insertion of the stripper between the blocks on the presser-bar and aid in centering the stripper and guiding its shoulders 43 toward said blocks, and by making the arms of spring wire they will automatically accommodate themselves to the lateral adjustment of the blocks on the presser-bar.

It will be observed that in using the carrier and stripper described the column of blanks are first adjusted in position, and their edges made to coincide while on the plate 30 and before being placed upon the machine. When the blanks are thus prepared, they are shifted by means of the plate into position beneath the presser-bar, the arms of the frame 40 thrust between the posts on the presser-bar until the shoulders 43 bear against the posts, and the pins 42 are brought vertically in front of the blanks, when the plate is drawn out from under the blanks, leaving them in position, after which the presser-bar is caused to descend and clamp the blanks.

The plate 30 and frame 40 are each provided with a suitable handle to aid in manipulating them.

Having thus described my invention, what I claim as new is—

1. In a scalloping-machine such as described, the combination, with a radially and laterally movable chisel provided with a saddle or bearing, of a stationary former against which the saddle bears for controlling the adjustment of the chisel, as set forth.

2. In a scalloping-machine such as described, the combination, with a radially and laterally movable chisel, of a saddle secured to said chisel and provided with bearings on opposite sides, and a curved former against which said bearings are pressed to adjust and guide the chisel, substantially as described.

3. In a scalloping-machine, the combination, with the presser-bar and a former or gage-plate mounted thereon, of a laterally and radially adjustable chisel provided with a saddle having two bearings for engaging the said former to control the position of the chisel, substantially as described.

4. In a scalloping-machine, the presser-bar, the posts secured thereto, a removable former supported on said posts, the adjustable chisel, and the saddle or bearing on the stem of the chisel co-operating with the former, substantially as described.

5. In a scalloping-machine, and in combination with the chisel, a series of superposed formers of different curvature, substantially as described.

6. In a scalloping machine provided with a reciprocating and laterally and radially adjustable chisel such as described, a former for controlling the position of the chisel, composed of a series of superposed plates of different curvature, substantially as described.

7. In a scalloping-machine, and in combination with a laterally-adjustable chisel such as described and an adjustable presser, a former mounted upon and carried by the presser in rear of the chisel, substantially as described.

8. The hereinbefore-described improved former for controlling the position of the movable chisel of a scalloping-machine, consisting, essentially, of a series of superposed formers of different curvature pivoted together at one end and detachably connected to the bottom former, substantially as described.

9. An adjustable former for scalloping, comprising a lower or base plate having a curved edge and a series of superposed plates, each succeeding plate having its edge formed with a sharper curve and overlapping the edge of the adjacent plate, substantially as described.

10. In a scalloping-machine such as described, the combination, with the blank-holding devices and main scalloping-chisel, of a laterally-movable supplemental chisel adapted to form the bottom cut or notch in the fly, substantially as described.

11. In a scalloping-machine such as described, and in combination with the main scalloping-chisel and the reciprocating plate for depressing the same, a supplemental chisel having a cutting edge corresponding to the last cut or notch in the fly, said supplemental chisel being supported in a movable frame to permit of its adjustment and movement laterally with respect to the reciprocating plate.

12. In a scalloping-machine, the combination, with the scalloping-chisel, of the reciprocating plate for actuating said chisel and the blank holding and adjusting devices, a supplemental chisel mounted in a movable frame, and a gage for guiding said chisel into position to form the last cut or notch in the blank.

13. In a scalloping-machine such as described, the combination, with the presser-bar and the adjustable block carrying the guide for locating the blanks, of the gage secured to said block and the chisel mounted in a laterally-movable frame to bring the cutter against said gage and beneath the reciprocating plate, substantially as described.

14. In a scalloping-machine such as described, the combination, with the presser-bar and the adjustable block carrying a guide for locating the blanks, of the gage attached to said block and serving to position the supplemental chisel for cutting the bottom notch in the fly-blank, substantially as described.

15. In a button-fly scalloping-machine, the combination, with the presser-bar and chisel, of the frame for supporting the latter, comprising the two sockets and connecting-link, substantially as described.

16. In a button-fly scalloping-machine such as described, wherein the scalloping chisel is movable laterally beneath a reciprocating plate and the blank-locating guides are adjustably connected to the presser-bar, the combination, with said presser-bar, of the former mounted on posts in position to engage and guide the chisel and the supplemental chisel also supported upon said presser-bar, substantially as described.

17. As a means for adjusting and placing a series of blanks in position beneath the presser-bar of a scalloping-machine, a plate provided with gages for adjusting the series of blanks, and a stripper engaging the edge of the blanks to retain the latter in position beneath the presser-bar while the plate is being withdrawn, substantially as described.

18. A blank adjusting and placing device consisting of a flat plate provided with pins or gages against which the edges of the blanks are adjusted and a stripping-frame provided with pins or shoulders for engaging the outer edges of the series of blanks to hold the latter in adjusted position while the plate is being withdrawn, substantially as described.

19. In combination with the presser-bar of a scalloping-machine and the adjustable gages for locating the blanks, the hereinbefore-described blank adjusting and placing device, comprising the carrying-plate and its gages, the stripping-frame provided with pins for engaging the front edge of the series of blanks, and shoulders co-operating with the presser-bar to adjust the position of said pins, substantially as described.

20. In combination with the presser-bar and the adjustable blank-locating guides, a blank-adjusting device provided with vertical pins or projections for engaging the outer face of the series of blanks, and shoulders provided with the blank-locating guides for determining the position of the blanks beneath the presser, substantially as described.

21. In a button-fly scalloping-machine and in combination with a work-support and a head, the one movable toward and from the other, a laterally movable chisel or cutter interposed between the head and work support, substantially as described.

22. In a button fly scalloping-machine and in combination with a work-support and a plate or head such as indicated, a laterally-movable chisel interposed between said head and support, and a guide or gage to adjust the position of the chisel, substantially as described.

23. In a button-fly scalloping-machine, the combination, with a work-support and a plate or head, the one movable toward and from the other, of a chisel interposed between said support and head, a laterally-movable support for the chisel, and a series of shoulders or graduated stops for determining the movement of the chisel after each cut is made, substantially as described.

CHARLES B. HATFIELD.

Witnesses:
JAS. M. HARRISON,
F. E. LESSLIE.